United States Patent
Tojo

(10) Patent No.: US 9,045,603 B2
(45) Date of Patent: Jun. 2, 2015

(54) REINFORCING FILM FOR THE ELECTROLYTE MEMBRANE OF A POLYMER ELECTROLYTE FUEL CELL

(75) Inventor: Mitsuo Tojo, Anpachi-gun (JP)

(73) Assignee: Teijin Dupont Films Japan Limited, Tokyo (JP)

(*) Notice: Subject to any disclaimer, the term of this patent is extended or adjusted under 35 U.S.C. 154(b) by 581 days.

(21) Appl. No.: 12/532,048

(22) PCT Filed: Mar. 18, 2008

(86) PCT No.: PCT/JP2008/055613
§ 371 (c)(1),
(2), (4) Date: Sep. 18, 2009

(87) PCT Pub. No.: WO2008/123261
PCT Pub. Date: Oct. 16, 2008

(65) Prior Publication Data
US 2010/0104919 A1 Apr. 29, 2010

(30) Foreign Application Priority Data
Mar. 20, 2007 (JP) .................. 2007-072465

(51) Int. Cl.
*H01M 2/08* (2006.01)
*C08J 5/18* (2006.01)
*H01M 8/02* (2006.01)
*H01M 8/10* (2006.01)

(52) U.S. Cl.
CPC ............. *C08J 5/18* (2013.01); *H01M 8/0273* (2013.01); *C08J 2367/02* (2013.01); *H01M 8/0291* (2013.01); *H01M 8/1039* (2013.01); *H01M 8/1053* (2013.01); *H01M 8/106* (2013.01); *H01M 8/1062* (2013.01); *H01M 2250/20* (2013.01); *H01M 2300/0094* (2013.01); *Y02E 60/521* (2013.01); *Y02T 90/32* (2013.01)

(58) Field of Classification Search
USPC .............................................. 33/463; 429/463
See application file for complete search history.

(56) References Cited

U.S. PATENT DOCUMENTS 6,197,430 B1 * 3/2001 Asakura et al. ............ 428/847.2
6,203,921 B1 * 3/2001 Carter et al. .................. 428/480
(Continued)

FOREIGN PATENT DOCUMENTS

CN 1536698 A 10/2004
CN 1733859 A 2/2006
(Continued)

OTHER PUBLICATIONS

Chinese Office Action in Application No. 200880008746.X dated Aug. 30, 2011.
(Continued)

*Primary Examiner* — Patrick Ryan
*Assistant Examiner* — Lucas J O'Donnell
(74) *Attorney, Agent, or Firm* — Sughrue Mion, PLLC

(57) ABSTRACT

A biaxially oriented film for reinforcing the electrolyte membrane of a polymer electrolyte fuel cell, wherein the film includes (i) a layer mainly composed of polyethylene naphthalene dicarboxylate and has (ii) a Young's modulus in at least one direction of not less than 9,000 MPa and (iii) a thickness of 15 to 150 μm. The biaxially oriented film has a satisfactory reinforcing effect as a reinforcing member for a polymer electrolyte membrane at the operation temperature of a polymer electrolyte fuel cell though it is a thin film.

16 Claims, 1 Drawing Sheet cross-section drawing of membrane-electrode assembly for polymer electrolyte fuel cells

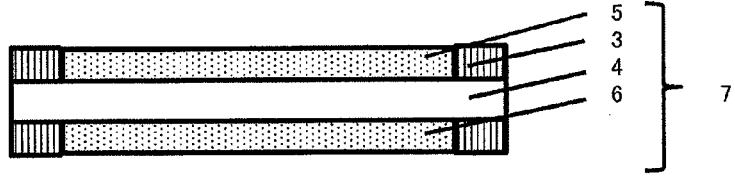

1 biaxially oriented film
2 adherent layer
3 frame composed of biaxially oriented frame-like film
4 electrolyte membrane
5 positive electrode
6 negative electrode
7 membrane-electrode assembly for polymer electrolyte fuel cells

(56) References Cited

U.S. PATENT DOCUMENTS

| | | | |
|---|---|---|---|
| 6,517,762 B1 * | 2/2003 | Tsunekawa et al. | 264/290.2 |
| 6,562,274 B1 * | 5/2003 | Asakura et al. | 264/290.2 |
| 7,214,339 B2 * | 5/2007 | Tsunekawa et al. | 264/289.6 |
| 8,278,007 B2 | 10/2012 | Gemba et al. | |
| 2004/0076844 A1 * | 4/2004 | Tojo et al. | 428/480 |
| 2007/0196718 A1 * | 8/2007 | Leistra et al. | 429/36 |
| 2009/0104507 A1 * | 4/2009 | Ohma et al. | 429/35 |

FOREIGN PATENT DOCUMENTS

| | | | |
|---|---|---|---|
| EP | 1 142 727 A1 | 10/2001 | |
| EP | 1 452 309 A1 | 9/2004 | |
| JP | 63-17023 A | 1/1988 | |
| JP | 05-021077 A | 1/1993 | |
| JP | 05-242897 A | 9/1993 | |
| JP | 07-065847 A | 3/1995 | |
| JP | 08-259710 A | 10/1996 | |
| JP | 10-154521 A | 6/1998 | |
| JP | 10-199551 A | 7/1998 | |
| JP | 2003-082488 A | 3/2003 | |
| JP | 2004-035582 A | 2/2004 | |
| JP | 2004-319153 A | 11/2004 | |
| JP | 2005-525681 A | 8/2005 | |
| JP | 2006-077224 A | 3/2006 | |
| JP | 2006-210335 A | 8/2006 | |
| JP | 2006-224305 A | 8/2006 | |
| JP | 2007-048524 A | 2/2007 | |
| JP | 2007-066769 A | 3/2007 | |
| JP | 2007-103170 A | 4/2007 | |
| JP | 2007-250249 A | 9/2007 | |
| JP | 2008-293989 A | 12/2008 | |
| WO | 01/30584 A1 | 5/2001 | |
| WO | WO 2003096456 A3 | 11/2003 | |
| WO | 2006/070892 A1 | 7/2006 | |
| WO | 2006/090898 A1 | 8/2006 | |
| WO | WO 2007026546 | 3/2007 | |
| WO | WO 2007026546 A1 * | 3/2007 | |

OTHER PUBLICATIONS

English translation of the International Preliminary Report on Patentability dated Oct. 1, 2009 in PCT/JP2008/055613.

Japanese Office Action for corresponding Application No. 2007-072465 dispatch date Aug. 21, 2012.

European Search Report for Application No. 08738855.9-2119 / 2133947 dated Oct. 29, 2012.

Database WPI; Week 200735, Thomson Scientific, London, GB; AN 2007-368211; XP002685549 (2007).

Database WPI; Week 199650, Thomson Scientific, London, GB; AN 1996-502789; XP002685550 (1996).

Database WPI; Week 199833, Thomson Scientific, London, GB; AN 1998-383035; XP002685551 (1998).

* cited by examiner

Fig.1    cross-section drawing of biaxially oriented film and adherent layer

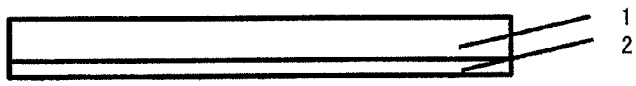

Fig.2    front view of frame composed of biaxially oriented frame-like film and electrolyte membrane

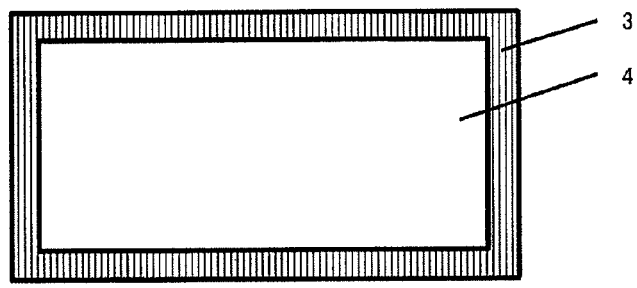

Fig.3    cross-section drawing of membrane-electrode assembly for polymer electrolyte fuel cells

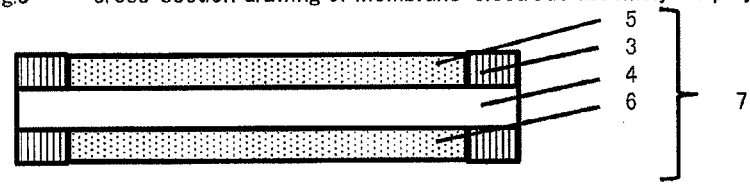

1 biaxially oriented film
2 adherent layer
3 frame composed of biaxially oriented frame-like film
4 electrolyte membrane
5 positive electrode
6 negative electrode
7 membrane-electrode assembly for polymer electrolyte fuel cells

REINFORCING FILM FOR THE ELECTROLYTE MEMBRANE OF A POLYMER ELECTROLYTE FUEL CELL

TECHNICAL FIELD

The present invention relates to a biaxially oriented film suitable for use as a reinforcing member for the electrolyte membrane of a polymer electrolyte fuel cell (may be referred to as "PEFC" hereinafter). More specifically, it relates to a film having a satisfactory reinforcing effect at the operation temperature of PEFC as a reinforcing member for electrolyte membranes though it is a thin film.

BACKGROUND ART

The development of fuel cells is now under way actively from the viewpoint of environmental problems. There are known polymer electrolyte fuel cells, phosphoric acid fuel cells, molten carbonate fuel cells and solid oxide fuel cells according to the type of the electrolyte in use. Since polymer electrolyte fuel cells (PEFC) out of these are characterized by a relatively low reaction temperature and the easy fixing of an electrolyte, the use of PEFC as a small-sized home power supply, portable power supply or power supply for mobile objects is being started, and the development of PEFC for use in automobiles is now under way.

PEFC is a fuel cell which makes use of a phenomenon that a polymer resin membrane having a proton (hydrogen ion) exchange group in the molecule serves as a proton conductive electrolyte when it is impregnated with water until it is saturated. PEFC comprises a polymer electrolyte membrane which is composed of a polymer ion exchange membrane (cation exchange membrane) and a membrane-electrode assembly (fuel cell) which has an anode-side electrode and a cathode-side electrode arranged on the respective sides of this electrolyte and is sandwiched by a separator. A fuel gas supplied to the anode-side electrode, for example, hydrogen is changed into a hydrogen ion on a catalytic electrode to be moved toward the cathode-side electrode through the polymer electrolyte membrane which has been suitably humidified. An electron generated during this is taken out into an external circuit to be used as DC electric energy. Since an oxidant gas, for example, an oxygen gas or air is supplied to the cathode-side electrode, the above hydrogen ion, the above electron and oxygen are reacted with one another on the cathode-side electrode to produce water.

A perfluorosulfonic acid resin film (for example, Nafion (trade mark of E.I. DuPont De Nemours And Co.)) is used as the polymer electrolyte membrane and generally operated at a temperature of about 50 to 100° C. to reduce the resistivity of the polymer electrolyte membrane so as to obtain high power generation efficiency. The improvement of conductivity and the reduction of costs are required for this polymer electrolyte membrane, and it is hard to handle this polymer electrolyte membrane because it is a very thin film-like material. Therefore, when the polymer electrolyte membrane is joined to the electrodes or when a plurality of electric cells are stacked one upon another to obtain a laminate, the peripheral portion of the polymer electrolyte membrane wrinkles very often. Even when there are no wrinkles at all, the electrolyte membrane has the lowest mechanical strength among the constituent members of the stack.

To cope with this, JP-A 7-65847 proposes a reinforcing frame for reinforcing an electrolyte membrane mechanically and preventing a leak of a fuel gas or an oxidant gas from the interface with the electrolyte membrane. A reinforcing frame having desired mechanical strength and corrosion resistance even at the operation temperature is preferred, and polycarbonates, polyethylene terephthalate, glass fiber reinforced epoxy resin, titanium and carbon are disclosed as examples of the material of the reinforcing frame. Although a polycarbonate reinforcing frame is used in Examples of the above publication, when a polycarbonate is used, it is excellent in heat-resistant dimensional stability at an operation temperature of about 50 to 100° C. but inferior in mechanical strength.

JP-A 10-199551 proposes the use of a frame membrane having airtightness in the peripheral portion of a porous material fixed on the both sides of an electrolyte membrane. Polycarbonates, ethylene propylene copolymer, polyesters, modified polyphenylene oxide, polyphenylene sulfide and acrylonitrile styrene are enumerated as the material of the frame membrane.

When the materials proposed in these documents are made thin, their reinforcing effect degrades. They also have a defect that their reinforcing effect is not satisfactory at the operation temperature of PEFC.

JP-A 2007-103170 and JP-A 2007-250249 propose the use of polyethylene naphthalene dicarboxylate as a reinforcing member for the electrolyte membrane of PEFC. However, these documents were laid open after the priority date of the present application.

(Patent Document 1) JP-A 7-65847
(Patent Document 2) JP-A 10-199551
(Patent Document 3) JP-A 2007-103170
(Patent Document 4) JP-A 2007-250249

DISCLOSURE OF THE INVENTION

It is therefore an object of the present invention to provide a film for reinforcing an electrolyte membrane, which has a satisfactory reinforcing effect at the operation temperature of PEFC though it is a thin film. It is another object of the present invention to provide a film for reinforcing the electrolyte membrane of PEFC, which has excellent heat-resistant dimensional stability at a high temperature and high hydrolysis resistance. It is still another object of the present invention to provide a reinforced electrolyte membrane for PEFC, which is excellent in form stability and vibration resistance. It is a further object of the present invention to provide a membrane-electrode assembly (may be referred to as "MEA" hereinafter) for PEFC, which is excellent in form stability and vibration resistance.

The inventors of the present invention have conducted intensive studies on the characteristic properties of a film required as a reinforcing member for the electrolyte membrane of PEFC used in mobile objects such as automobiles which have an operation temperature of about 50 to 100° C. and to which a vibration or impact is applied. As a result, they have found that a polyethylene naphthalene dicarboxylate thin film having a Young's modulus in at least one direction at room temperature of not less than 9,000 MPa has a satisfactory reinforcing effect. The present invention has been accomplished based on this finding.

That is, the present invention is a biaxially oriented film for reinforcing the electrolyte membrane of a polymer electrolyte fuel cell (PEFC), wherein the film comprises (i) a layer mainly composed of polyethylene naphthalene dicarboxylate and has (ii) a Young's modulus in at least one direction of not less than 9,000 MPa and (iii) a thickness of 15 to 150 µm.

The present invention also includes a polymer electrolyte fuel cell having the above film.

The present invention also includes a reinforced electrolyte membrane for polymer electrolyte fuel cells, which comprises an electrolyte membrane and two biaxially oriented frame-like films opposed to each other with the electrolyte membrane therebetween, wherein each of the frame-like film comprises (i) a layer mainly composed of polyethylene naphthalene dicarboxylate and has (ii) a Young's modulus in at least one direction of not less than 9,000 MPa and (iii) a thickness of 15 to 150 μm.

The present invention further includes a membrane-electrode assembly (MEA) for polymer electrolyte fuel cells, which has an electrolyte membrane, a frame composed of two biaxially oriented frame-like films, a positive electrode and a negative electrode, wherein the two frame-like films are opposed to each other with the electrolyte membrane therebetween, the positive electrode and the negative electrode are opposed to each other with the electrolyte membrane therebetween in the frame, and each of the frame-like films comprises (i) a layer mainly composed of polyethylene naphthalene dicarboxylate and has (ii) a Young's modulus in at least one direction of not less than 9,000 MPa and (iii) a thickness of 15 to 150 μm.

The present invention further includes a method of using a biaxially oriented film which comprises (i) a layer mainly composed of polyethylene naphthalene dicarboxylate and has (ii) a Young's modulus in at least one direction of not less than 9,000 MPa and (iii) a thickness of 15 to 150 μm. as a reinforcing member for the electrolyte membrane of a polymer electrolyte fuel cell.

BRIEF DESCRIPTION OF THE DRAWINGS

FIG. 1 is a cross-section drawing of a biaxially oriented film and adherent layer in the present invention.

FIG. 2 shows a front view of a frame composed of a biaxially oriented frame-like film and electrolyte membrane.

FIG. 3 is a cross-section drawing of a membrane-electrode assembly for polymer electrolyte fuel cells.

The reference numerals in the figures are defined as follows:
1 biaxially oriented film
2 adherent layer
3 frame composed of biaxially oriented frame-like film
4 electrolyte membrane
5 positive electrode
6 negative electrode
7 membrane-electrode assembly for polymer electrolyte fuel cells

BEST MODE FOR CARRYING OUT THE INVENTION

The present invention will be described in detail hereinunder.
<Polyethylene Naphthalene Dicarboxylate>

The polyethylene naphthalene dicarboxylate (may be abbreviated as PEN hereinafter) constituting the film of the present invention comprises a naphthalenedicarboxylic acid as the main dicarboxylic acid component and ethylene glycol as the main glycol component. Examples of the naphthalenedicarboxylic acid include 2,6-naphthalenedicarboxylic acid, 2,7-naphthalenedicarboxylic acid and 1,5-naphthalenedicarboxylic acid. Out of these, 2,6-naphthalenedicarboxylic acid is preferred. The word "main" as used herein means not less than 80 mol %, preferably not less than 90 mol %, much more preferably not less than 95 mol % of the total of all the recurring units of the polymer.

The layer mainly composed of PEN preferably contains not less than 80 mol % of ethylene-2,6-naphthalene dicarboxylate based on the total number of moles of all the recurring units.

PEN may contain not more than 20 mol % of a comonomer. When PEN is a copolymer, the comonomer constituting the copolymer may be a compound having two ester forming functional groups in the molecule. Examples of the compound include dicarboxylic acids such as oxalic acid, adipic acid, phthalic acid, sebacic acid, dodecanedicarboxylic acid, isophthalic acid, terephthalic acid, 1,4-cyclohexanedicarboxylic acid, 4,4'-diphenyldicarboxylic acid, phenylindanedicarboxylic acid, 2,7-naphthalenedicarboxylic acid, tetraphosphorus dicarboxylic acid, decalin dicarboxylic acid and diphenyl ether dicarboxylic acid, and oxycarboxylic acids such as p-oxybenzoic acid and p-oxyethoxybenzoic acid. Dihydric alcohols such as trimethylene glycol, tetramethylene glycol, hexamethylene glycol, cyclohexane methylene glycol, neopentyl glycol, ethylene oxide adduct with bisphenol sulfone, ethylene oxide adduct with bisphenol A, diethylene glycol and polyethylene oxide glycol are also preferably used. These compounds may be used alone or in combination of two or more. Out of these, isophthalic acid, terephthalic acid, 4,4'-diphenyldicarboxylic acid, 2,7-naphthalenedicarboxylic acid and p-oxybenzoic acid are preferred acid components. Trimethylene glycol, hexamethylene glycol, neopentyl glycol and ethylene oxide adduct with bisphenol sulfone are preferred glycol components.

Polyesters and organic polymers except for the polyesters which can be mixed with PEN include polyesters such as polyethylene terephthalate, polyethylene isophthalate, polytrimethylene terephthalate, polyethylene 4,4'-tetramethylene diphenyl dicarboxylate, polyethylene-2,7-naphthalene dicarboxylate, polytrimethylene-2,6-naphtahlene dicarboxylate, polyneopentylene-2,6-naphthalene dicarboxylate and poly(bis(4-ethyleneoxyphenyl)sulfone)-2,6-naphthalene dicarboxylate. Out of these, polyethylene isophthalate, polytrimethylene terephthalate, polytrimethylene-2,6-naphthalene dicarboxylate and poly(bis(4-ethyleneoxyphenyl)sulfone)-2,6-naphthalene dicarboxylate are preferred. These polyesters and organic polymers except for the polyesters are preferably used in an amount of not more than 20 mol % based on the total number of moles of all the recurring units of the polymer constituting the layer essentially composed of PEN and may be used alone or in combination of two or more.

Some or all of the terminal hydroxyl groups and/or carboxyl groups of PEN may be capped by a monofunctional compound such as benzoic acid or methoxypolyalkylene glycol, or copolymerized with a very small amount of a trifunctional or more ester forming compound such as glycerin or pentaerythritol to obtain a substantially linear polymer.

PEN can be manufactured by a generally known polyester manufacturing method. For example, it can be manufactured by reacting a dicarboxylic acid with a glycol to directly obtain a polyester having a low degree of polymerization and further polymerizing this polyester in the presence of a polymerization catalyst to obtain a polyester. Alternatively, it can be manufactured by carrying out an ester interchange reaction between a lower alkyl ester of a dicarboxylic acid and a glycol to obtain a polyester having a low degree of polymerization and further polymerizing this polyester in the presence of a polymerization catalyst to obtain a polyester.

Further, PEN obtained by melt polymerization may be formed into a chip and the solid-phase polymerization of the chip may be carried out under heating and reduced pressure or in an inert gas stream such as nitrogen. The hydrolysis resistance of a biaxially oriented film is further improved by carrying out the solid-phase polymerization.

The intrinsic viscosity of PEN is preferably 0.50 to 0.90 dl/g. It is more preferably 0.52 to 0.85 dl/g, particularly preferably 0.53 to 0.80 dl/g. When the intrinsic viscosity falls below the lower limit, the film is readily broken at the time of forming it, the obtained film becomes fragile, or the hydrolytic properties of the film degrade. When the intrinsic viscosity of PEN exceeds the upper limit, the intrinsic viscosity of the polymer must be greatly increased and polymerization takes long with an ordinary synthesizing method, thereby reducing productivity. The intrinsic viscosity of PEN after it is formed into a biaxially oriented film is preferably 0.45 to 0.85 dl/g, more preferably 0.47 to 0.80 dl/g, particularly preferably 0.50 to 0.75 dl/g. The intrinsic viscosity is a value (unit: dl/g) measured at 35° C. by using o-chlorophenol as a solvent.

<Additives>

The film of the present invention may contain inert particles in limits that do not impair the effect of the present invention in order to improve the handling properties of the film. Examples of the inert particles include inorganic particles which contain the IIA, IIB, IVA or IVB element of the periodic table (for example, kaolin, alumina, titanium oxide, calcium carbonate and silicon dioxide) and fine particles of a polymer having high heat resistance such as crosslinked silicone resin, crosslinked polystyrene or crosslinked acrylic resin particles. When inert particles are contained, the average particle diameter of the inert particles is preferably in the range of 0.001 to 5 μm, and the total amount of the inert particles is 0.01 to 10 wt % based on the total weight of the film. The film of the present invention may contain small amounts of an ultraviolet absorbent, antioxidant, antistatic agent, optical stabilizer and heat stabilizer as required.

<Young's Modulus>

The film of the present invention has a Young's modulus in at least one direction of not less than 9,000 MPa. Since the film of the present invention has such a high elastic modulus, it can have a high reinforcing effect at the operation temperature as a reinforcing member for an electrolyte membrane. In the present invention, the direction in which the Young's modulus is not less than 9,000 MPa may be referred to as "main orientation axis direction". Preferably, the film of the present invention has a Young's modulus in at least one direction of not less than 9,500 MPa. When the Young's modulus in at least one direction falls below the lower limit, the Young's modulus of the film at 50 to 100° C. which is the operation temperature of PEFC greatly lowers, whereby when the fuel cell is mounted on an automobile, the film cannot fully hold the electrolyte membrane against a vibration or impact as a reinforcing member during driving and damages the polymer electrolyte membrane. Thus, the film cannot exhibit a reinforcing effect.

When the Young's modulus in at least one direction of the film is not less than 9,000 MPa, the upper limit of the Young's modulus in that direction is not particularly limited but preferably not more than 12,000 MPa. The direction in which the Young's modulus is not less than 9,000 MPa is preferably the transverse direction (may be referred to as "width direction" or "TD direction" hereinafter) of the film. The direction in which the Young's modulus is not less than 9,000 MPa may be either the longitudinal direction or the transverse direction. However, to obtain a film having a heat shrinkage factor in the longitudinal direction and the transverse direction which will be specified hereinafter, when the film is stretched by sequential biaxial orientation to obtain a Young's modulus in the longitudinal direction of not less than 9,000 MPa, a thermal relaxation treatment at a high relaxation rate must be carried out in the longitudinal direction in order to achieve a desired heat shrinkage factor in the longitudinal direction. In the case of sequential biaxial orientation, as thermal relaxation in the longitudinal direction is controlled by the difference between the speed of a feed roll and the speed of a take-up roll, the film cannot be treated at a very high relaxation rate and therefore, the Young's modulus in the transverse direction of the film is preferably set to not less than 9,000 MPa.

The difference between the Young's modulus in the longitudinal direction (may be referred to as "continuous film forming direction", "lengthwise direction" or "MD direction" hereinafter) and the Young's modulus in the transverse direction is preferably 2,000 to 8,000 MPa as an absolute value. When the absolute value of the difference between the Young's modulus in the longitudinal direction and the Young's modulus in the transverse direction falls below the lower limit, a very high Young's modulus is required in both the longitudinal direction and the transverse direction and it is difficult to achieve such a high Young's modulus with the current film stretching technology. When the absolute value of the difference between the Young's modulus in the longitudinal direction and the Young's modulus in the transverse direction exceeds the upper limit, the elastic modulus in the direction in which the Young's modulus is lower becomes unsatisfactory. When some impact is applied in the direction in which the Young's modulus is lower, the film may be unsatisfactory in terms of reinforcing effect as a reinforcing member.

The Young's modulus can be controlled by the draw ratio. For instance, by stretching the film to 4.5 to 6.5 times, the Young's modulus in that direction can be set to not less than 9,000 MPa.

The film of the present invention preferably has a Young's modulus in at least one direction in a 90° C. temperature atmosphere of not less than 4,000 MPa. The Young's modulus in at least one direction in a 90° C. temperature atmosphere is more preferably not less than 4,200 MPa, much more preferably not less than 4,500 MPa. When the Young's modulus in at least one direction in a 90° C. temperature atmosphere falls below the lower limit and the film of the present invention is mounted on an automobile as an electrolyte reinforcing member, the film cannot fully hold the electrolyte membrane against a vibration or impact during driving at a range of 50 to 100° C. which is the operation temperature of the polymer electrolyte fuel cell (PEFC) as a reinforcing member, damages the electrolyte membrane and may not be able to exhibit a reinforcing effect.

When the film of the present invention has a Young's modulus in at least one direction in a 90° C. temperature atmosphere of not less than 4,000 MPa, the upper limit of the Young's modulus at 90° C. in that direction is not particularly limited but preferably not more than 7,000 MPa. The direction in which the above Young's modulus in a 90° C. temperature atmosphere is obtained is the same as the direction in which the Young's modulus at room temperature is not less than 9,000 MPa.

The Young's modulus can be controlled by the draw ratio. For instance, the Young's modulus at 90° C. can be set to not less than 4,000 MPa by stretching the film to 4.5 to 6.5 times.

The Young's modulus at room temperature or in a 90° C. temperature atmosphere can be obtained from the tangent of a rising portion in a load-elongation curve obtained by stretching the film with the Tensilon UCT-100 of Orientec Co., Ltd. at a chuck interval of 100 mm, a stretching rate of 10 mm/min and a chart rate of 500 mm/min. Film test samples having a length of 150 mm and a width of 10 mm are used to obtain the Young's modulus in the longitudinal direction of the film which is the long side of one test sample and the Young's modulus in the transverse direction of the film which is the long side of the other test sample. The measurement of the Young's modulus in a 90° C. temperature atmosphere can be obtained by carrying out the above tensile test after the test sample and the chuck portion of the Tensilon are set in a chamber which is set to a 90° C. temperature atmosphere and left for 2 minutes.

<Film Thickness>

The thickness of the film of the present invention is 15 to 150 μm. The lower limit of the thickness of the film is preferably 18 μm, more preferably 20 μm, much more preferably 23 μm. The upper limit of the thickness of the film is preferably 140 μm, more preferably 135 μm, much more preferably 120 μm. When the thickness of the film falls below the lower limit, the film may not obtain a satisfactory reinforcing effect as a reinforcing member for electrolyte membranes. When the thickness of the film exceeds the upper limit, it may be difficult to reduce the size of the cell.

<Rupture Elongation at Break>

The film of the present invention is used under conditions under which hydrolysis resistance is required. That is, the film of the present invention is used in contact with the surface of the electrolyte membrane which contains water at a temperature range of about 50 to 100° C. Therefore, the reduction of rupture elongation caused by hydrolysis is preferably small even when the film is used in a high-temperature high-humidity environment for a long time. Therefore, the film of the present invention preferably has a rupture elongation at break ($R^x$) represented by the following equation (1) in the direction in which the Young's modulus is not less than 9,000 MPa of not less than 50%.

$$R^x (\%) = X/X^0 \times 100 \quad (1)$$

In the equation (1), X is a rupture elongation (%) after the film is treated at 121° C., 2 atm and 100% RH for 200 hours, $X^0$ is the initial rupture elongation (%) before the treatment, and $R^x$ is a rupture elongation at break (%).

When the rupture elongation at break ($R^x$) represented by the equation (1) falls below the lower limit, the film may not hold a satisfactory reinforcing effect as a reinforcing member during a long term use in a high-temperature high-humidity environment. The above rupture elongation at break ($R^x$) is more preferably not less than 55%. Meanwhile, the rupture elongation at break ($R^x$) is preferably higher but generally less than 100%, specifically no more than 90%.

The above hydrolysis resistance is attained by using PEN as a polymer material and orientating molecules at a high draw ratio, specifically stretching the film to 4.5 to 6.5 times, like the means of achieving the above Young's modulus.

<Heat Shrinkage Factor>

Preferably, the film of the present invention has heat shrinkage factors in the longitudinal direction and the transverse direction of not more than 2.0% after it is heated at 150° C. for 30 minutes from the viewpoint of heat-resistant dimensional stability at a high processing temperature because it may be processed at a temperature around 140 to 160° C. and used in a membrane-electrode assembly. The heat shrinkage factors in the longitudinal direction and the transverse direction of the film after it is heated at 150° C. for 30 minutes are more preferably not more than 1.8%, much more preferably not more than 1.5%.

When the heat shrinkage factors exceed the upper limit, the difference in heat shrinkage factor between the reinforcing member and the electrolyte membrane becomes large, whereby the electrolyte membrane may break or wrinkle at the time of processing, thereby causing a trouble in the performance of the electrolyte membrane. When the heat shrinkage factor in either one of the longitudinal direction and the transverse direction exceeds the upper limit, the electrolyte membrane readily warps, whereby a trouble may occur in the original performance of the electrolyte membrane. The lower limit of heat shrinkage factor is preferably lower.

The difference in heat shrinkage factor between the longitudinal direction and the transverse direction of the film after it is heated at 150° C. for 30 minutes is preferably not more than 0.6% as an absolute value. When the above difference in heat shrinkage factor exceeds the upper limit, the electrolyte membrane readily warps, whereby a trouble may occur in the original performance of the electrolyte membrane.

To set the heat shrinkage factor at 150° C. to the above range, PEN is used as the polymer and the film is stretched at a predetermined draw ratio, heat set at a predetermined temperature and subjected to a predetermined thermal relaxation treatment. Although the film of the present invention has a very high Young's modulus in at least one direction, from the viewpoint of maintaining the performance of the electrolyte membrane, the difference in shrinkage factor between the longitudinal direction and the transverse direction is preferably small to achieve heat-resistant dimensional stability at a high temperature. To reduce the difference in shrinkage factor between the longitudinal direction and the transverse direction, the film is preferably stretched at a high draw ratio in the main orientation axis direction, heat set and further subjected to a thermally relaxation treatment at a relaxation rate of 1 to 7% in that direction. In the direction orthogonal to the main orientation axis direction, the film is stretched at a lower draw ratio than in the main orientation axis direction and heat set but not subjected to a thermally relaxation treatment in that direction. When a thermal relaxation treatment is carried out, it is preferably carried out at a lower thermal relaxation rate than in the main orientation axis direction.

<Adherent Layer>

Preferably, the film of the present invention has an adherent layer comprising acrylic resin on at least one side of the layer mainly composed of polyethylene naphthalene dicarboxylate (PEN).

The adherent layer is preferably formed on at least one side of the layer essentially composed of PEN or maybe formed on both sides of the layer.

The film of the present invention is bonded to the peripheral portion of the electrolyte membrane as a frame-like reinforcing member for the electrolyte membrane. In the polymer electrolyte fuel cell (PEFC), an electrode layer is formed on both sides of the electrolyte and smaller than the electrolyte membrane, and the frame-like reinforcing member which is the film of the present invention is arranged to surround the peripheries of the electrode layers. Since a diffusion layer larger than the electrode layers is formed on the outer sides of these electrode layers, one surface of the reinforcing member which is the film of the present invention comes in contact with the peripheral portion of the electrolyte membrane and the other surface comes into contact with the peripheral portion of the diffusion layer. When the film has an adherent layer on one side, the adherent layer may be formed on either the electrode membrane side or the diffusion layer side.

The adherent layer and the electrolyte membrane or the diffusion layer may be directly bonded together or through an adhesive layer. When the film is firmly bonded to at least one of the electrolyte membrane and the diffusion layer, its performance as a reinforcing member is further improved. When they are bonded together through an adhesive layer, although the type of the adhesive is not particularly limited, an adhesive comprising a polymer constituting the electrolyte membrane, specifically a perfluorosulfonic acid polymer as the main component is used.

The acrylic resin contained in the adherent layer is an acrylic resin comprising the following acrylic monomer. That is, examples of the acrylic monomer include alkyl acrylates and alkyl methacrylates (examples of the alkyl group include methyl group, ethyl group, n-propyl group, isopropyl group, n-butyl group, isobutyl group, t-butyl group, 2-ethylhexyl group and cyclohexyl group); hydroxyl-containing monomers such as 2-hydroxyethyl acrylate, 2-hydroxyethyl methacrylate, 2-hydroxypropyl acrylate and 2-hydroxypropyl methacrylate; glycidyl acrylate and glycidyl methacrylate; and acrylic acid and methacrylic acid. These monomers may be used alone or in combination of two or more as comonomers. Methyl acrylate, ethyl acrylate, methyl methacrylate and ethyl methacrylate are particularly preferred acrylic monomers.

Monomers having a carboxyl group or a salt thereof such as itaconic acid, maleic acid, fumaric acid, crotonic acid, styrenesulfonic acid and salts thereof (sodium salts, potassium salts, ammonium salts, tertiary amine salts, etc.); acid anhydride monomers such as maleic anhydride and itaconic anhydride; and vinyl isocyanate, allyl isocyanate, styrene, α-methylstyrene, vinyl methyl ether, vinyl ethyl ether, vinyl trialkoxysilane, alkyl maleic monoester, alkyl fumaric monoester, alkyl itaconic monoester, acrylonitrile, methacrylonitrile, vinylidene chloride, ethylene, propylene, vinyl chloride, vinyl acetate and butadiene may be used in the acrylic resin as the comonomer. The copolymerization ratio of the comonomer is preferably 0.1 to 60 mol %. The upper limit of the copolymerization ratio is more preferably 50 mol %. The lower limit of the copolymerization ratio is more preferably 1 mol %.

Preferably, the acrylic resin has an amide group. The acrylic resin having an amide group can be obtained by introducing the following acrylic monomer having an amide group into the acrylic resin as a comonomer.

Examples of the acrylic monomer having an amide group include acrylamide, methacrylamide, N-alkylacrylamide, N-alkylmethacrylamide, N,N-dialkylacrylamide, N,N,-dialkylmethacrylamide (examples of the alkyl group include methyl group, ethyl group, n-propyl group, isopropyl group, n-butyl group, isobutyl group, t-butyl group, 2-ethylhexyl group and cyclohexyl group), N-alkoxyacrylamide, N-alkoxymethacrylamide, N, N-dialkoxyacrylamide, N,N-dialkoxymethacrylamide (examples of the alkoxy group include methoxy group, ethoxy group, butoxy group and isobutoxy group), N-methylolacrylamide, N-methylolmethacrylamide, N-phenylacrylamide, N-phenylmethacrylamide and acryloylmorpholine.

The acrylic resin having an amide group (may be referred to as "acrylic copolymer" hereinafter) may contain at least one of the above monomers having an amide group. When an amide group is existent in the acrylic copolymer, adhesion to the electrolyte membrane, the diffusion layer or the adherent layer is further improved.

A particularly preferred acrylic monomer having an amide group is selected from acrylamide, methacrylamide, N-alkylacrylamide, N,N-dialkylacrylamide, N,N-dialkyl methacrylate (examples of the alkyl group include methyl group, ethyl group, n-propyl group, isopropyl group, n-butyl group, isobutyl group, t-butyl group, 2-ethylhexyl group and cyclohexyl group), N-methylolacrylamide, N-methylolmethacrylamide and acryloylmorpholine.

When the acrylic resin is an acrylic copolymer having an amide group, the copolymerization ratio of the acrylic component having an amide group is preferably 0.2 to 20 mol %. The upper limit of the copolymerization ratio is more preferably 10 mol %, particularly preferably 5 mol %. The lower limit of the copolymerization ratio is more preferably 1 mol %, particularly preferably 2 mol %. When the copolymerization ratio of the acrylic component having an amide group falls within the above range, adhesion to the electrolyte membrane, the diffusion layers or the adherent layer can be further improved.

The adherent layer may contain a polyester copolymer or urethane resin, or a modified product thereof such as acryl modified polyester or acryl modified urethane as a binder component, in addition to the above acrylic resin. The adherent layer preferably contains a mixture with a polyester copolymer. When the adherent layer contains a mixture of a polyester copolymer and the acrylic resin, as for the mixing ratio, preferably, the amount of the acrylic resin is 20 to 80 wt % and the amount of the polyester copolymer is 80 to 20 wt %.

A crosslinking agent such as epoxy, oxazoline, melamine, isocyanate, silane coupling agent or zirco-aluminum coupling agent may be added to the adherent layer to further improve its heat resistance. Out of these, epoxy is particularly preferred.

A coating fluid used to form the adherent layer is preferably a water dispersible or aqueous coating fluid. As long as it does not affect the acrylic resin and other additives, it may contain a trace amount of an organic solvent. This coating fluid may be mixed with a required amount of a surfactant such as an anionic surfactant, cationic surfactant or nonionic surfactant.

Preferably, the surfactant can reduce the surface tension of the aqueous coating fluid to 40 mN/m or less and promotes the wetting of the polyester film. Examples of the surfactant include polyoxyethylene-fatty acid esters, sorbitan fatty acid esters, glycerin fatty acid esters, fatty acid metal soap, alkyl sulfates, alkyl sulfonates, alkyl sulfosuccinates, quaternary ammonium chloride salts, alkyl amine hydrochloric acid and betain surfactants.

To form the adherent layer, for example, an aqueous coating fluid containing a component for forming the adherent layer is applied to one side or both sides of a polyester film which can be stretched, dried and stretched and optionally heated. The polyester film which can be stretched is used synonymously with a polyester film before crystal orientation is completed and refers to an unstretched polyester film, monoaxially oriented polyester film or biaxially oriented polyester film. Out of these, a polyester film which has been stretched monoaxially in the extrusion direction (longitudinal direction) is particularly preferred. In other words, the adherent layer is preferably formed before the crystalline orientation of the layer essentially composed of polyethylene naphthalene dicarboxylate is completed.

To apply the coating fluid to the polyester film, when a general coating step, that is, a step which is separate from the step of forming a polyester film is carried out on a heat set polyester film after biaxial stretching, dust and dirt are readily contained in the coating film. From this point of view, coating in a clean atmosphere, that is, coating in the film production step is preferred. As for coating, any known coating technique is used. For example, roll coating, gravure coating, roll brush coating, spray coating, air knife coating, impregnation and curtain coating may be used alone or in combination.

<Production Method>

The film of the present invention can be manufactured by a known film forming method. For example, it can be manufactured by melt extruding fully dried PEN at its melting point to (melting point+70)° C., quenching it on a casting drum to obtain an unstretched film, biaxially stretching the unstretched film sequentially or simultaneously and heat setting it. When it is formed by sequential biaxial stretching, it is stretched to 4.5 to 6.5 times so that the Young's modulus (main orientation axis direction) in at least one of the longitudinal direction and the transverse direction becomes not less than 9,000 MPa. In the direction orthogonal to the main orientation axis direction, it is preferably stretched to 2.3 to 5.0 times. The draw ratio in the main orientation axis direction is more preferably 4.7 to 6.0 times. The draw ratio in the direction orthogonal to the main orientation axis direction is more preferably 2.5 to 4.5 times, much more preferably 2.8 to 4.0 times. The main orientation axis direction is preferably the transverse direction because the thermal relaxation treatment is easy. Stretching in each direction may be carried out once or twice to ensure that the total draw ratio becomes a predetermined value. When the draw ratio exceeds 5.5 times, specifically 6.0 times, stretching is preferably carried out twice. Preferably, the stretching temperature in the longitudinal direction is 130 to 170° C. and the stretching temperature in the transverse direction is 130 to 150° C. When stretching is carried out twice in one direction, the temperature for second stretching is preferably 10 to 50° C. higher than the temperature for first stretching. Heat setting is preferably carried out at 217 to 235° C., more preferably 220 to 230° C. under tension or restricted shrinkage, and the heat setting time is preferably 1 to 1,000 seconds. In the case of simultaneous biaxial stretching, the above temperature, draw ratio and heat setting temperature can be used.

In the present invention, to obtain heat shrinkage factor characteristics at 150° C., a thermal relaxation treatment is preferably carried out after heat setting. Stated more specifically, it is preferably carried out at a thermal relaxation rate of 1 to 7% in the main orientation axis direction at a temperature range of 180 to 200° C. The thermal relaxation rate is more preferably 2 to 6%.

<Use>

The film of the present invention is used as a reinforcing member for the electrolyte membrane of PEFC having an operation temperature of about 50 to 100° C. An example of PEFC is a fuel cell for mobile objects. Further, the film of the present invention can exhibit a satisfactory reinforcing effect as a reinforcing member even when a vibration or impact is applied thereto at the above operation temperature though it is a thin film and can be advantageously used in PEFC for automobiles.

Therefore, the present invention includes a polymer electrolyte fuel cell (PEFC) having the above film.

<Reinforced Electrolyte Membrane>

The film of the present invention is preferably used as a reinforcing member for the electrolyte membrane of PEFC. Therefore, the present invention includes a reinforced electrolyte membrane for PEFC comprising an electrolyte membrane and two biaxially oriented frame-like films which are opposed to each other with the electrolyte membrane therebetween.

In the reinforced electrolyte membrane of the present invention, the film used as the frame-like film is as described above. The frame-like film is preferably shaped just like a frame in which the center portion is cut out to form electrodes and the film is existent only in the peripheral portion. The two frame-like films sandwich the peripheral portion of the electrolyte membrane to support it from both sides.

In the reinforced electrolyte membrane of the present invention, as for the direction in which the two films are joined together, the films may be laminated together in such a manner that the directions of these films in which the Young's modulus is not less than 9,000 MPa become the same, or at random.

In the reinforced electrolyte membrane of the present invention, preferably, the directions of the two frame-like films in which the Young's modulus is not less than 9,000 MPa become orthogonal to each other. When the two frame-like films are joined together in such a manner that the directions of the films in which Young's modulus is not less than 9,000 MPa become orthogonal to each other, a reinforced electrolyte membrane having excellent strength even when an impact is applied from any direction is obtained.

In the reinforced electrolyte membrane of the present invention, the electrolyte membrane is preferably made of a perfluorosulfonic acid resin.

The present invention includes a method of using the film of the present invention as a reinforcing member for the electrolyte membrane of a polymer electrolyte fuel cell (PEFC).

<Membrane-Electrode Assembly>

The present invention includes a membrane-electrode assembly (MEA) for polymer electrolyte fuel cells (PEFC), which comprises the films of the present invention, an electrolyte membrane, a positive electrode and a negative electrode.

The MEA of the present invention has an electrolyte membrane, a frame composed of two biaxially oriented frame-like films, a positive electrode and a negative electrode, the two frame-like films are opposed to each other with the electrolyte membrane therebetween, and the positive electrode and the negative electrode are opposed to each other with the electrolyte membrane therebetween in the frame.

In the MEA of the present invention, the film used as the frame-like film is as described above. The frame-like film is preferably shaped just like a frame in which the center portion is cut out to form the electrodes and the film is existent only in the peripheral portion. The two frame-like films sandwich the peripheral portion of the electrolyte membrane to support it from both sides.

In the MEA of the present invention, as for the direction in which the two films are laminated together, the films may be laminated together in such a manner that the directions of these films in which the Young's modulus is not less than 9,000 MPa become the same, or at random.

In the MEA of the present invention, preferably, the directions of the two frame-like films in which the Young's modulus is not less than 9,000 MPa become orthogonal to each other. When the two frame-like films are laminated together in such a manner that the directions of the films in which Young's modulus is not less than 9,000 MPa become orthogonal to each other, an MEA having excellent strength even when an impact is applied from any direction is obtained.

In the MEA of the present invention, the electrolyte membrane is preferably made of a perfluorosulfonic acid resin.

The negative electrode (fuel electrode) is an electrode for decomposing a fuel such as hydrogen or methanol into a proton and an electron. The negative electrode is preferably a carbon black carrier supporting a platinum catalyst or ruthenium-platinum alloy catalyst thereon. The positive electrode (air electrode) is an electrode for reacting a proton from the electrolyte membrane and an electron from a conductor wire with oxygen contained in air to produce water. The positive electrode (air electrode) is preferably a carbon black carrier supporting a platinum catalyst thereon.

The Figure shows one embodiment of the present invention, having a bixially oriented film 1 for reinforcing the electrolyte membrane of a polymer electrolyte fuel cell, wherein the film comprises (i) a layer mainly composed of polyethylene naphthalene dicarboxylate and has (ii) a Young's modulus in at least one direction of not less than 9,000 MPa and (iii) a thickness of 15 to 150 µm, wherein an adherent layer 2 comprising acrylic resin is formed on at least one side of the layer mainly composed of polyethylene naphthalene dicarboxylate.

EXAMPLES

The following examples are provided for the purpose of further illustrating the present invention but are in no way to be taken as limiting. The values of characteristic properties were measured by the following methods. "Parts" and "%" in the examples mean "parts by weight" and "wt %", respectively, unless stated otherwise.

(1) Young's Modulus

A test sample having a length of 150 mm and a width of 10 mm cut out from the film was used to calculate its Young's modulus from the tangent of a rising portion in a load-elongation curve obtained by stretching it with the Tensilon UCT-100 of Orientec Co., Ltd. in a chamber set to a temperature of 20° C. and a humidity of 50% at a chuck interval of 100 mm, a stretching rate of 10 mm/min and a chart rate of 500 mm/min. The Young's modulus in the longitudinal direction is a value measured in the longitudinal direction (MD direction) of the film and the Young's modulus in the transverse direction is a value measured in the transverse direction (width direction) of the film. The Young's modulus was measured 10 times and the average value of the measurement data was used.

The Young's modulus in a 90° C. temperature atmosphere was obtained by carrying out the above tensile test after the test sample and the chuck portion of Tensilon were set in the chamber in a 90° C. temperature atmosphere and leaving them for 2 minutes.

(2) Rupture Elongation at Break

A strip-like test sample having a length of 150 mm and a width of 10 mm cut out from the film was hung by a stainless clip in an environmental test apparatus set to 121° C., 2 atm and 100% RH in a wet saturation mode for 200 hours. Thereafter, the test sample was taken out to measure its rupture elongation. This measurement was carried out 5 times to obtain the average value of the measurement data, and the rupture elongation at break ($R^x$) represented by the following equation (1) was obtained to evaluate the hydrolysis resistance of the film. The Tensilon UCT-100 of Orientec Co., Ltd. was used as the measurement device to carry out the measurement under the same conditions as the measurement of the Young's modulus. The test sample was cut out in such a manner that the long side of the test sample became the main orientation axis direction of the film.

$$R^x (\%) = X/X^0 \times 100 \qquad (1)$$

(X is a rupture elongation (%) after 200 hours of a treatment at 121° C., 2 atm and 100% RH, $X^0$ is the initial rupture elongation (%) before the treatment, and $R^x$ is a rupture elongation at break (%).

(3) Heat Shrinkage Factor

After a 30 cm×30 cm film whose length had been accurately measured and whose longitudinal direction and transverse direction had been marked was placed in an oven set to 150° C. under no load and kept for 30 minutes, it was taken out and returned to room temperature so as to read its dimensional change. The heat shrinkage factors in the longitudinal direction and the transverse direction of the film were obtained from the length ($L_0$) before the heat treatment and the dimensional change ($\Delta L$) by the heat treatment based on the following equation (2).

$$\text{Heat shrinkage factor } (\%) = (\Delta L/L_0) \times 100 \qquad (2)$$

(4) Adhesion

A 50 mm×50 mm perfluorosulfonic acid resin film (Nafion 117 of E.I. DuPont De Nemours And Co.) was used as the electrolyte membrane, and a film of the same size was placed on one side of the membrane and bonded to the membrane by thermal pressing at 140° C. When the film had an adherent layer, they were laminated together in such a manner that the adherent layer came into contact with the electrolyte membrane. The corner on the electrolyte membrane side of the obtained test sample was rubbed with a finger 10 times to check the peeling of the electrolyte membrane.

(5) Form Stability of Electrolyte Membrane

A 100 mm×100 mm perfluorosulfonic acid resin film (Nafion 117 of E.I. DuPont De Nemours And Co.) was used as the electrolyte membrane, and a frame-like film (outer circumference: 100 mm×100 mm, inner circumference: 80 mm×80 mm) was placed on both sides of the resin film in such a manner that the main orientation axis directions of these films became orthogonal to each other and bonded to the resin film by thermal pressing at 140° C. The wrinkling of the electrolyte membrane within the frame of the films after the treatment was checked with eyes to evaluate the form stability of the electrolyte membrane based on the following criteria.

◯: Both small wrinkles and undulant deformation are not seen in the electrolyte membrane.

Δ: Undulant deformation is not seen in the electrolyte membrane but small wrinkles are seen near the frame.

X: Undulant deformation is seen in the electrolyte membrane.

(6) Evaluation of Reinforcing Performance of Reinforcing Member

The electrolyte membrane and the frame-like film prepared for the evaluation of the form stability of the electrolyte membrane (5) were fixed in a vibration tester to carry out sweep at an amplitude of 0.75 mm (longitudinal direction) and at a frequency of 10 Hz, 55 Hz and 10 Hz in 60 seconds in a 90° C. atmosphere, and this cycle was repeated 10 times. After this, changes such as wrinkling, breakage and damage of the electrolyte membrane were checked with eyes and evaluated based on the following criteria.

◯: Reinforcing performance is excellent because the wrinkling, break and damage of the electrolyte membrane are not seen.

X: Reinforcing performance is not satisfactory because at least one of the wrinkling, break and damage of the electrolyte membrane is seen.

Example 1

100 Parts by Weight of Dimethyl 2,6-naphthalenedicarboxylate, 60 parts by weight of ethylene glycol, 0.03 part by weight of manganese acetate tetrahydrate as an ester interchange catalyst, 0.10 wt % of spherical silica particles having an average particle diameter of 0.3 and 0.15 wt % of spherical silica particles having an average particle diameter of 0.12 µm as lubricants were added to carry out an ester interchange reaction in accordance with a commonly used method. The amounts of the lubricants are based on the weight of the film. Thereafter, 0.042 part by weight of triethyl phosphonoacetate was added to terminate the ester interchange reaction substantially. Then, 0.024 part by weight of antimony trioxide was added to carry out a polymerization reaction in a high-temperature high-vacuum atmosphere in accordance with a commonly used method so as to obtain polyethylene-2,6-naphthalene dicarboxylate (PEN, Tg=121° C.) having an intrinsic viscosity of 0.60 dl/g. This PEN polymer was dried at 175° C. for 5 hours, supplied into an extruder to be molten at 300° C., extruded from a die slit and solidified by cooling on a casting drum having a surface temperature of 55° C. to obtain an unstretched film.

This unstretched film was stretched to 3.5 times in the longitudinal direction (continuous film forming direction) at 140° C. to obtain a monoaxially oriented film. An aqueous coating fluid A having a solid content of 3 wt % was applied to one side of the monoaxially oriented film to a coating weight of 4 g/m² by kiss-roll coating. This coating fluid A was prepared by mixing 90 wt % of an acrylic copolymer which consisted of 70 mol % of methyl methacrylate, 22 mol % of ethyl acrylate, 4 mol % of N-methylolacrylamide and 4 mol % of N,N-dimethylacrylamide with 10 wt % of polyoxyethylene lauryl ether (n=7) as solid content. Thereafter, this film was stretched to 4.8 times in the traverse direction (width direction) at 135° C. and further to 1.15 times in the transverse direction at 175° C. sequentially, heat set at 225° C. and further re-heated at 190° C. while it was shrunk by 4% in the transverse direction as a thermal relaxation treatment to obtain a biaxially oriented polyester film having a thickness of 38 µm. The characteristic properties of the obtained film are shown in Table 1. The obtained film had a Young's modulus in the transverse direction of not less than 9,000 MPa and was excellent in hydrolysis resistance and dimensional stability at a high temperature. Further, it was also excellent in adhesion to the electrolyte membrane as well as the evaluation of the form stability of the electrolyte membrane and the evaluation of the reinforcing performance of the reinforcing member.

Example 2

A biaxially oriented film having a thickness of 38 µm was obtained in the same manner as in Example 1 except that a coating fluid was not applied to one side of the monoaxially oriented film. The characteristic properties of the obtained film are shown in Table 1. The obtained film had a Young's modulus in the transverse direction of not less than 9,000 MPa and was excellent in hydrolysis resistance and dimensional stability at a high temperature. Further, it was also excellent in the evaluation of the form stability of the electrolyte membrane and the evaluation of the reinforcing performance of the reinforcing member.

Example 3

A biaxially oriented film having a thickness of 38 µm was obtained in the same manner as in Example 1 except that the draw ratio in the longitudinal direction was changed to 3.0 times. The characteristic properties of the obtained film are shown in Table 1. The obtained film had a Young's modulus in the transverse direction of not less than 9,000 MPa and was excellent in hydrolysis resistance and dimensional stability at a high temperature. Further, it was also excellent in adhesion to the electrolyte member as well as the evaluation of the form stability of the electrolyte membrane and the evaluation of the reinforcing performance of the reinforcing member.

Example 4

A biaxially oriented film having a thickness of 38 µm was obtained in the same manner as in Example 1 except that the draw ratio in the longitudinal direction was changed to 3.8 times and the draw ratio in the transverse direction was changed to 4.6 times at 135° C. and to 1.15 times at 175° C. The characteristic properties of the obtained film are shown in Table 1. The obtained film had a Young's modulus in the transverse direction of not less than 9,000 MPa and was excellent in hydrolysis resistance and dimensional stability at a high temperature. Further, it was also excellent in adhesion to the electrolyte membrane as well as the evaluation of the form stability of the electrolyte membrane and the evaluation of the reinforcing performance of the reinforcing member.

Example 5

A biaxially oriented polyester film having a thickness of 38 µm was obtained in the same manner as in Example 1 except that the unstretched film was stretched to 5.6 times in the longitudinal direction, the coating fluid was not applied to one side of the monoaxially oriented film, and the monoaxially oriented film was stretched to 3.2 times in the transverse direction (width direction) at 135° C. sequentially, heat set at 220° C. and further re-heated at 190° while it was shrunk by 2% in the transverse direction as a thermal relaxation treatment. The characteristic properties of the obtained film are shown in Table 1. The obtained film had a Young's modulus in the longitudinal direction of not less than 9,000 MPa and was excellent in the evaluation of the reinforcing performance of the reinforcing member. It was also excellent in hydrolysis resistance. However, the obtained film was unsatisfactory in terms of dimensional stability at a high temperature and the form stability of the electrolyte membrane when it was heated at a high temperature.

Comparative Example 1

A biaxially oriented film having a thickness of 38 µm was obtained in the same manner as in Example 1 except that the unstretched film was stretched to 3.2 times in the longitudinal direction, the coating fluid was not applied to one side of the monoaxially oriented film, and the monoaxially oriented film was stretched to 3.2 times in the transverse direction (width direction) at 135° C. sequentially, heat set at 238° C. and further re-heated at 230° C. while it was shrunk by 2% in the transverse direction as a thermal relaxation treatment. The characteristic properties of the obtained film are shown in Table 1. The obtained film had Young's moduli in the longitudinal direction and the transverse direction of less than 9,000 MPa and could not achieve satisfactory reinforcing performance as a reinforcing member. It was unsatisfactory in terms of hydrolysis resistance.

Comparative Example 2

0.10 wt % of spherical silica particles having an average particle diameter of 0.3 µm and 0.15 wt % of spherical silica particles having an average particle diameter of 0.12 µm were added as lubricants to polyethylene terephthalate (PET) having an intrinsic viscosity of 0.61 dl/g. This PET polymer was dried at 170° C. for 3 hours, supplied into an extruder to be molten at 280° C., extruded from a die slit and solidified by cooling on a casting drum having a surface temperature of 20° C. to prepare an unstretched film. This unstretched film was stretched to 3.0 times in the longitudinal direction at 110° C. to obtain a monoaxially oriented film. Thereafter, the monoaxially oriented film was stretched to 3.2 times in the transverse direction at 120° C. sequentially, heat set at 220° C. and re-heated at 210° C. while it was shrunk by 2% in the transverse direction as a thermal relaxation treatment to obtain a biaxially oriented film having a thickness of 38 μm. The characteristic properties of the obtained film are shown in Table 1. The obtained film had Young's moduli in the longitudinal direction and the transverse direction of less than 9,000 MPa and could not achieve satisfactory reinforcing performance as a reinforcing member. Further, the film was unsatisfactory in terms of hydrolysis resistance as well as dimensional stability at a high temperature and the form stability of the electrolyte membrane when it was heated at a high temperature.

TABLE 1

|  | Young's modulus | | 90° C. Young's modulus | Hydrolysis resistance in high Young's modulus direction (rupture elongation at break) % |
| --- | --- | --- | --- | --- |
|  | Longitudinal direction MPa | Transverse direction MPa | Main orientation axis direction MPa | |
| Example 1 | 5500 | 9800 | 5400 | 65 |
| Example 2 | 5500 | 9800 | 5400 | 65 |
| Example 3 | 5400 | 10300 | 5700 | 70 |
| Example 4 | 5800 | 9100 | 5000 | 65 |
| Example 5 | 9100 | 5600 | 4900 | 60 |
| Comparative Example 1 | 5900 | 6100 | 3100 | 30 |
| Comparative Example 2 | 5350 | 5300 | 2400 | 0 |

|  | 150° C. heat shrinkage factor | | Adhesion | Form stability of electrolyte membrane | Evaluation of reinforcing performance of reinforcing member |
| --- | --- | --- | --- | --- | --- |
|  | Longitudinal direction % | Transverse direction % | | | |
| Example 1 | 1.2 | 1.5 | Not peeled | ○ | ○ |
| Example 2 | 1.2 | 1.5 | Peeled | ○ | ○ |
| Example 3 | 1.3 | 1.8 | Not peeled | ○ | ○ |
| Example 4 | 1.8 | 1.2 | Not peeled | ○ | ○ |
| Example 5 | 5.1 | 1.5 | — | Δ | ○ |
| Comparative Example 1 | 0.5 | 0.6 | — | ○ | X |
| Comparative Example 2 | 3.0 | 4.7 | — | X | X |

Effect of the Invention

The film of the present invention has a satisfactory reinforcing effect at the operation temperature of PEFC though it is a thin film. The film of the present invention has excellent dimensional stability at a high temperature and high hydrolysis resistance. The film of the present invention is excellent in vibration resistance. The film of the present invention can fix the electrolyte membrane stably without damaging the electrolyte membrane when it is mounted on a mobile object and a vibration or impact is applied thereto during driving.

The reinforced electrolyte membrane of the present invention is excellent in form stability and vibration resistance. The membrane-electrode assembly (MEA) of the present invention is excellent in form stability and vibration resistance.

INDUSTRIAL FEASIBILITY

The film of the present invention is advantageously used as a reinforcing member for the electrolyte membrane of PEFC.

The invention claimed is:

1. A frame composed of a biaxially oriented frame-like film for reinforcing the electrolyte membrane of a polymer electrolyte fuel cell, wherein the frame-like film comprises (i) a polyester layer consisting of polyethylene naphthalene dicarboxylate, wherein the polyester layer is the only layer which contains polyester, and the frame-like film has (ii) a Young's modulus in at least one direction in a 20° C. atmosphere of not less than 9,000 MPa, (iii) a thickness of 15 to 150 μm, (iv) heat shrinkage factors in the longitudinal direction and the transverse direction after 30 minutes of a heat treatment at 150° C. of not more than 2.0%, (v) a rupture elongation at break ($R^x$) represented by the following equation (1) of not less than 50% in the direction in which the Young's modulus is not less than 9,000 MPa:

$$R^x (\%) = X/X^0 \times 100 \quad (1)$$

wherein X is a rupture elongation (%) after 200 hours of a treatment at 121° C., 2 atm and 100% RH, $X^0$ is the initial rupture elongation (%) before the treatment and $R^x$ is a rupture elongation at break (%), and (vi) a Young's modulus in at least one direction in a 90° C. atmosphere of not less than 4,800 MPa, and (vii) an absolute value of the difference between the Young's modulus in the longitudinal direction and the Young's modulus in the transverse direction in a 20° C. atmosphere of 2,000 to 8,000 MPa, and (viii) wherein the film is formed by (viii-1) sequentially biaxially stretching, in which the draw ratio in the main orientation axis direction is 4.5 to 6.5 times and the draw ratio in the direction orthogonal to the main orientation axis direction is 2.3 to 5.0 times, (viii-2) heat setting at 220 to 230° C., and (viii-3) a thermal relaxing at a rate of 2 to 6%.

2. The frame according to claim 1 wherein the frame-like film comprises not less than 80 mol % of ethylene-2,6-naphthalene dicarboxylate based on the total number of moles of all the recurring units.

3. The frame according to claim 1, wherein an adherent layer comprising acrylic resin is formed on at least one side of the layer consisting of polyethylene naphthalene dicarboxylate.

4. The frame according to claim 3, wherein the acrylic resin is an acrylic resin containing an amide group.

5. The frame according to claim 3, wherein the adherent layer is formed before crystalline orientation of the layer consisting of polyethylene naphthalene dicarboxylate is completed.

6. The frame according to claim 1 wherein the frame-like film has a Young's modulus in the transverse direction in a 20° C. atmosphere of not less than 9,000 MPa.

7. The frame according to claim 1, wherein the polymer electrolyte fuel cell is for a mobile object.

8. The frame according to claim 7, wherein the mobile object is an automobile.

9. A reinforced electrolyte membrane for polymer electrolyte fuel cells, comprising an electrolyte membrane and two frames composed of a biaxially oriented frame-like film which are opposed to each other with the electrolyte membrane therebetween, wherein
each of the frame-like films comprises (i) a polyester layer consisting of polyethylene naphthalene dicarboxylate, wherein the polyester layer is the only layer which contains polyester, and
the frame-like film has
(ii) a Young's modulus in at least one direction in a 20° C. atmosphere of not less than 9,000 MPa,
(iii) a thickness of 15 to 150 μm,
(iv) heat shrinkage factors in the longitudinal direction and the transverse direction after 30 minutes of a heat treatment at 150° C. of not more than 2.0%, and
(v) a rupture elongation at break ($R^x$) represented by the following equation (1) of not less than 50% in the direction in which the Young's modulus is not less than 9,000 MPa:

$$R^x (\%) = X/X^0 \times 100 \tag{1}$$

wherein X is a rupture elongation (%) after 200 hours of a treatment at 121° C., 2 atm and 100% RH, $X^0$ is the initial rupture elongation (%) before the treatment and $R^x$ is a rupture elongation at break (%), and
(vi) a Young's modulus in at least one direction in a 90° C. atmosphere of not less than 4,800 MPa, and
(vii) an absolute value of the difference between the Young's modulus in the longitudinal direction and the Young's modulus in the transverse direction in a 20° C. atmosphere of 2,000 to 8,000 MPa, and
(viii) wherein the film is formed by
(viii-1) sequentially biaxially stretching, in which the draw ratio in the main orientation axis direction is 4.5 to 6.5 times and the draw ratio in the direction orthogonal to the main orientation axis direction is 2.3 to 5.0 times,
(viii-2) heat setting at 220 to 230° C., and
(viii-3) a thermal relaxing at a rate of 2 to 6%.

10. The reinforced electrolyte membrane according to claim 9, wherein the directions of the frames in which the Young's modulus in a 20° C. atmosphere is not less than 9,000 MPa are orthogonal to each other.

11. The reinforced electrolyte membrane according to claim 9, wherein the electrolyte membrane is made of a perfluorosulfonic acid resin.

12. A membrane-electrode assembly for polymer electrolyte fuel cells, comprising an electrolyte membrane, two frames composed of a biaxially oriented frame-like film, a positive electrode and a negative electrode, wherein
the two frame-like films are opposed to each other with the electrolyte membrane therebetween, the positive electrode and the negative electrode are opposed to each other with the electrolyte membrane therebetween in the frame, and each of the frame-like films comprises
(i) a polyester layer consisting of polyethylene naphthalene dicarboxylate, wherein the polyester layer is the only layer which contains polyester, and
each of the films has
(ii) a Young's modulus in at least one direction in a 20° C. atmosphere of not less than 9,000 MPa,
(iii) a thickness of 15 to 150 μM,
(iv) heat shrinkage factors in the longitudinal direction and the transverse direction after 30 minutes of a heat treatment at 150° C. of not more than 2.0%,
(v) a rupture elongation at break ($R^x$) represented by the following equation (1) of not less than 50% in the direction in which the Young's modulus is not less than 9,000 MPa:

$$R^x (\%) = X/X^0 \times 100 \tag{1}$$

wherein X is a rupture elongation (%) after 200 hours of a treatment at 121° C., 2 atm and 100% RH, $X^0$ is the initial rupture elongation (%) before the treatment and $R^x$ is a rupture elongation at break (%), and
(vi) a Young's modulus in at least one direction in a 90° C. atmosphere of not less than 4,800 MPa, and
(vii) an absolute value of the difference between the Young's modulus in the longitudinal direction and the Young's modulus in the transverse direction in a 20° C. atmosphere of 2,000 to 8,000 MPa, and
(viii) wherein the film is formed by
(viii-1) sequentially biaxially stretching, in which the draw ratio in the main orientation axis direction is 4.5 to 6.5 times and the draw ratio in the direction orthogonal to the main orientation axis direction is 2.3 to 5.0 times,
(viii-2) heat setting at 220 to 230° C., and
(viii-3) a thermal relaxing at a rate of 2 to 6%.

13. The membrane-electrode assembly according to claim 12, wherein the directions of the two frames in which the Young's modulus is not less than 9,000 MPa in a 20° C. atmosphere are orthogonal to each other.

14. The membrane-electrode assembly according to claim 12, wherein the electrolyte membrane is made of a perfluorosulfonic acid resin.

15. A method of using a frame composed of a biaxially oriented frame-like film for reinforcing the electrolyte membrane of polymer electrolyte fuel cells, wherein the frame-like film comprises
(i) a polyester layer consisting of polyethylene naphthalene dicarboxylate, wherein the polyester layer is the only layer which contains polyester, and
the film has
(ii) a Young's modulus in at least one direction in a 20° C. atmosphere of not less than 9,000 MPa,
(iii) a thickness of 15 to 150 μm as a reinforcing member for the electrolyte membrane of a polymer electrolyte fuel cell,
(iv) heat shrinkage factors in the longitudinal direction and the transverse direction after 30 minutes of a heat treatment at 150° C. of not more than 2.0%, (v) a rupture elongation at break ($R^x$) represented by the following equation (1) of not less than 50% in the direction in which the Young's modulus is not less than 9,000 MPa:

$$R^x(\%) = X/X^0 \times 100 \tag{1}$$

wherein X is a rupture elongation (%) after 200 hours of a treatment at 121° C., 2 atm and 100% RH, $X°$ is the initial rupture elongation (%) before the treatment and $R^x$ is a rupture elongation at break (%), and (vi) a Young's modulus in at least one direction in a 90° C. atmosphere of not less than 4,800 MPa, and (vii) an absolute value of the difference between the Young's modulus in the longitudinal direction and the Young's modulus in the transverse direction in a 20° C. atmosphere of 2,000 to 8,000 MPa, and (viii) wherein the film is formed by (viii-1) sequentially biaxially stretching, in which the draw ratio in the main orientation axis direction is 4.5 to 6.5 times and the draw ratio in the direction orthogonal to the main orientation axis direction is 2.3 to 5.0 times, (viii-2) heat setting at 220 to 230° C., and (viii-3) a thermal relaxing at a rate of 2 to 6%.

16. A polymer electrolyte fuel cell having the frame of claim 1.

* * * * *